United States Patent [19]

Byrne et al.

[11] Patent Number: 4,555,030
[45] Date of Patent: Nov. 26, 1985

[54] DISPOSABLE RAZOR RACK

[75] Inventors: David S. Byrne, Atlantic Highlands, N.J.; Evan N. Chen, Fairfield, Conn.

[73] Assignee: Warner-Lambert Company, Morris Plains, N.J.

[21] Appl. No.: 581,403

[22] Filed: Feb. 17, 1984

[51] Int. Cl.[4] ............................................. A47F 5/00
[52] U.S. Cl. ................................. 211/49.1; 206/354; 211/87; 211/59.2; 221/281
[58] Field of Search ............... 211/49 R, 49 D, 87, 211/59.1; 312/42; D6/88.86; 248/205.3; 206/460, 228, 349, 352, 354, 356; 221/281, 283

[56] References Cited

U.S. PATENT DOCUMENTS

| 1,054,707 | 3/1913 | Mertens | 211/490 |
| 4,140,244 | 2/1979 | Clabby | 211/49 D X |
| 4,445,610 | 5/1984 | Richards | 206/349 |
| 4,450,980 | 5/1984 | Clabby et al. | 206/228 X |

FOREIGN PATENT DOCUMENTS 2447907 4/1976 Fed. Rep. of Germany ... 248/205.3

Primary Examiner—Robert W. Gibson, Jr.
Attorney, Agent, or Firm—R. S. Strickler

[57] ABSTRACT

A wall bracket device or rack for receiving, containing and stacking a plurality of disposable wet shaving razors where each razor is removable individually for use.

2 Claims, 8 Drawing Figures

FIG.6
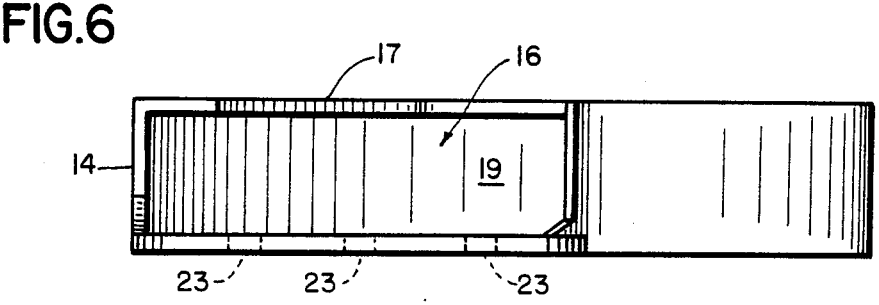
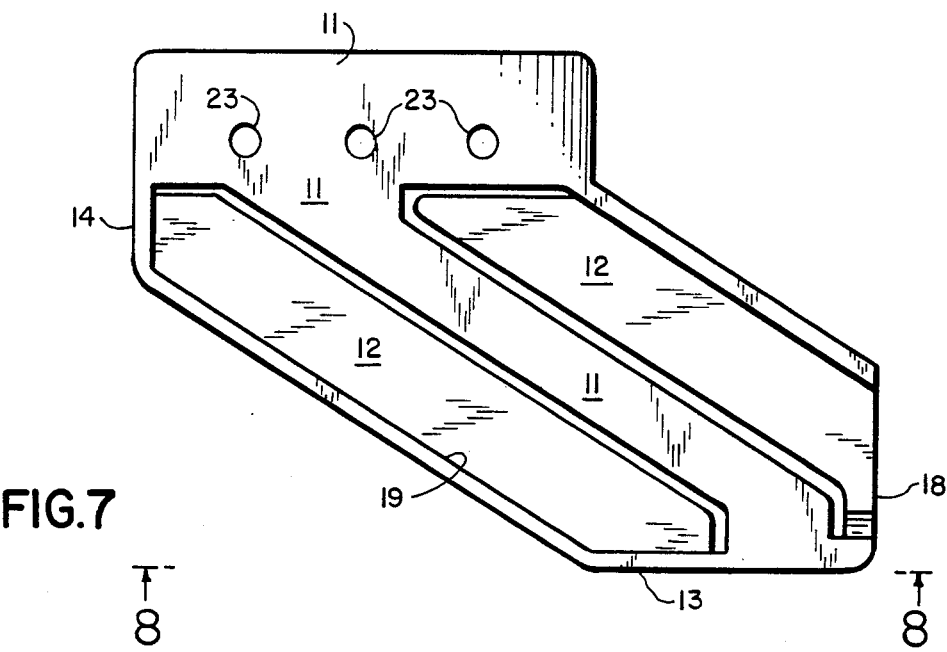
FIG.7
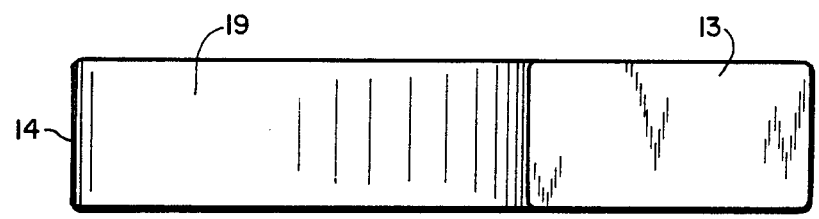
FIG.8

DISPOSABLE RAZOR RACK

FIELD OF THE INVENTION

The present invention relates to packaging and relates in particular to packages containing a plurality of articles arranged in a nested or interleaved relationship.

It is a particular feature of the invention to provide a package or rack in the form of a wall bracket adapted to receive and store a plurality of razors available for manual removal from the rack individually.

BRIEF DESCRIPTION OF THE PRIOR ART

Prior art packages for containing a plurality of disposable razors are shown and described in U.S. Pat. Nos. 4,266,664, 4,322,002 and 4,341,306.

The '664 reference shows a paperboard package enclosing a plurality of razors each having a generally T-shaped configuration where a handle portion is enclosed within an envelope and a contiguous razor head projects beyond the envelope with mating flaps overlaying and protecting the head of each razor.

The '002 and '306 references are similar in that both show reversed stacks of razors. In the '002 patent, the handles are slotted and a tongue of paperboard is threaded through the slotted handles to make the package secure.

BRIEF DESCRIPTION OF THE INVENTION

The present invention includes a molded plastic container or rack having an access opening for receiving a head portion and an inclined slot for receiving a handle portion of a number of disposable razors. The rack is formed with a ramp so that, as individual razors are introduced into the access opening with their mating handles projecting through said inclined slot, gravity operates to stack the razors, head upon head, automatically.

A rack device embracing certain principles of the present invention may comprise a molded plastic frame having a rear wall spaced from a front wall, said front wall having an inclined slot terminating in a stop, a side wall and a bottom wall joining said front and rear walls, a ramp joining said side wall and the bottom wall, an access opening intersecting said slot operative to receive razors individually and sequentially whereby said razors traverse said ramp and said inclined slot in response to gravity, said stop being effective to cause said razors to stack automatically along said ramp.

Other features and advantages of the present invention will become apparent from an examination of the succeeding specification when read in conjunction with the appended drawings, in which:

BRIEF DESCRIPTION OF THE DRAWINGS

FIG. 6 is a top view of FIG. 2 reversed 180°;

FIG. 7 is an elevation of the front side of FIG. 6; and

FIG. 8 is a bottom view of FIG. 6.

DETAILED DESCRIPTION OF THE INVENTION

Figure 2:
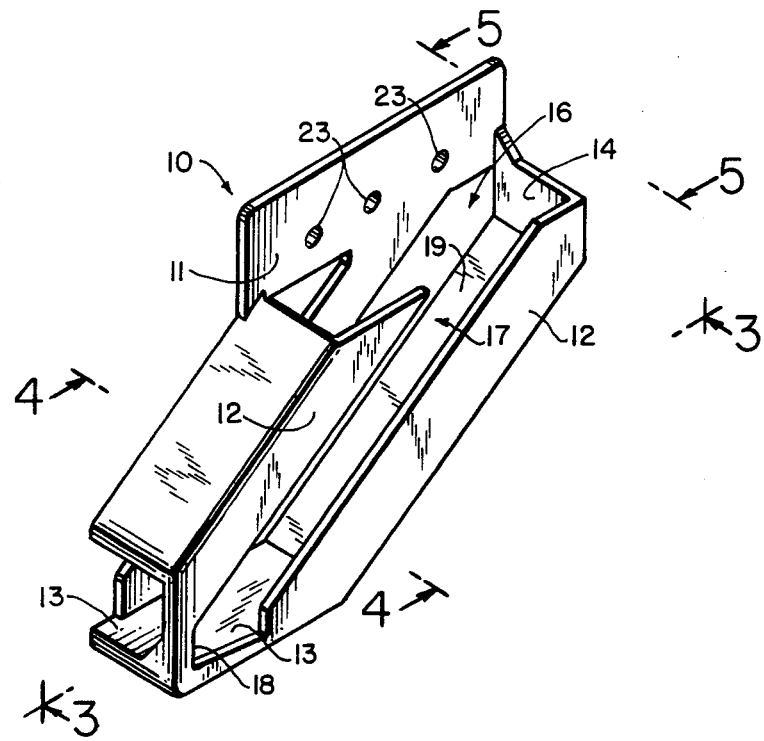
FIG. 2 is a perspective view of the empty rack.
Figure 3:
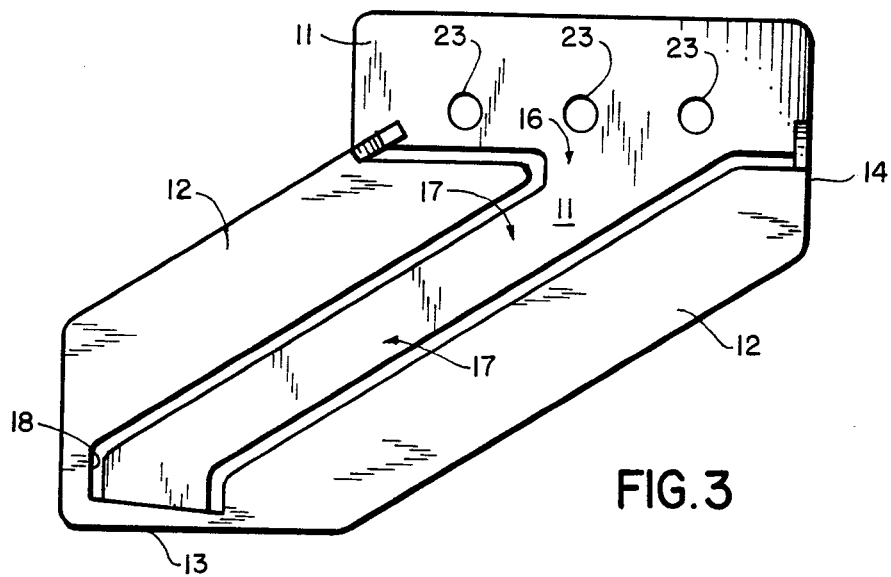
FIG. 3 is a front elevation of the empty rack.
Figure 4:
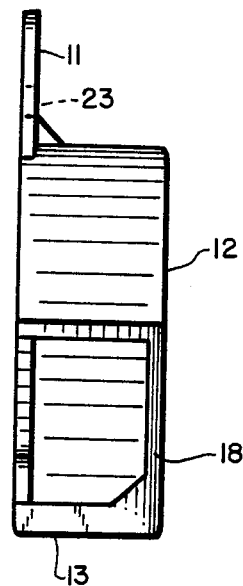
FIG. 4 is an elevation of the left end of FIG. 2.
Figure 5:
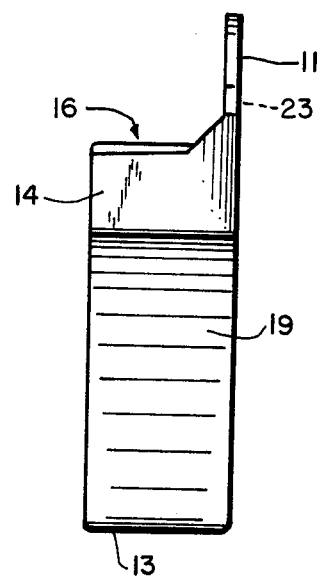
FIG. 5 is an elevation of the right end of FIG. 2.

Referring in detail in FIG. 2, the molded plastic rack 10 includes a generally flat back wall 11, a generally flat front wall 12 joined by a bottom wall 13 and a side wall 14. A razor head access opening 16 intersects a slot or handle access opening 17. The slot 17 terminates in a stop 18.

Bottom wall 13 and side wall 14 join a ramp 19 which is inclined so as to be generally parallel to slot 17.

Figure 1:
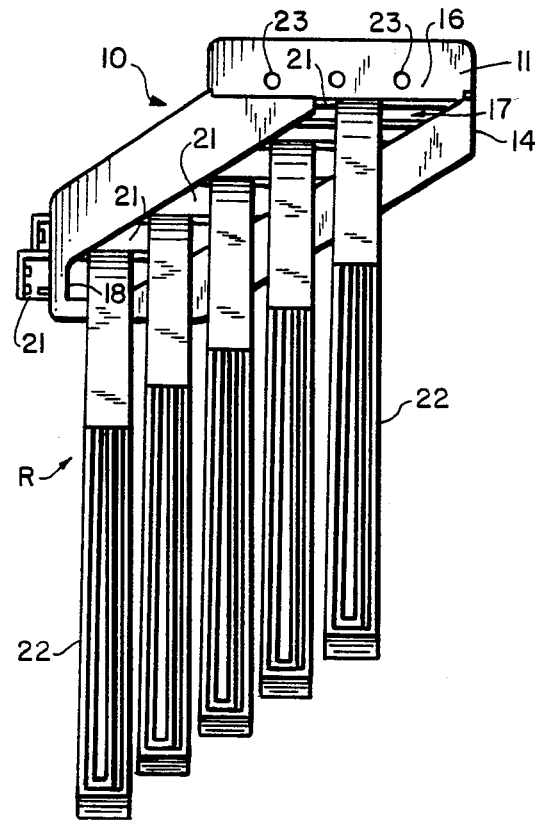
FIG. 1 is a front elevation of the rack device filled with razors.

As is most apparent in FIG. 1, rack 10 is filled with a plurality (five in this embodiment) of disposable razors R of generally T-shaped configuration each having a head portion 21 and a contiguous handle portion 22.

Head portions 21 are received in access opening 16 while handle portions 22 are received within and project through slot 17.

Razors are introduced into the rack individually and sequentially so that gravity pulls each razor down the ramp 19 and along the slot 17 so that the head portions 21 stack, head upon head, while handle portions align in parallel fashion as shown in FIG. 1.

For purposes of mounting the rack upon a fixed building or cabinet wall, the rear wall 11 of rack can be coated with a pressure-sensitive adhesive (not shown) or formed with mounting holes 23 are desired.

It is anticipated that a wide variety of design changes can be devised without departing from the spirit and scope of the invention.

What is claimed is:

1. A reusable bracket device or rack for containing, stacking and dispensing a plurality of articles such as disposable razors, each razor having a head and a handle defining a T-shaped configuration comprising in combination:

a unitary molded plastic frame having a flat rear wall spaced from a flat front wall, said front wall being intercepted by a diagonal slot terminating in a stop, a side wall and a bottom wall joining said front and rear walls, a ramp parallel to said slot joining said side wall and said bottom wall, a first razor access opening intersecting said slot dimensioned to receive razor heads, said first opening serving dually as a dispensing outlet, a second access opening at said bottom wall operative to receive a portion of at least one of said heads and a plurality of razors contained in said frame, each said razor head having been received at said first access opening and having traversed said ramp and said slot in response to gravity, said bottom wall, said second access opening and said stop cooperating to stack the razors on the ramp automatically and to align all heads in horizontal, parallel tiers within said frame and said handles in vertical, parallel array outside said frame.

2. The frame of claim 1 including a top wall parallel to said ramp and parallel to said slot overlaying said ramp and operating as a secondary stop to maintain said tiered and parallel arrays of razors.

* * * * *